Patented Feb. 27, 1940

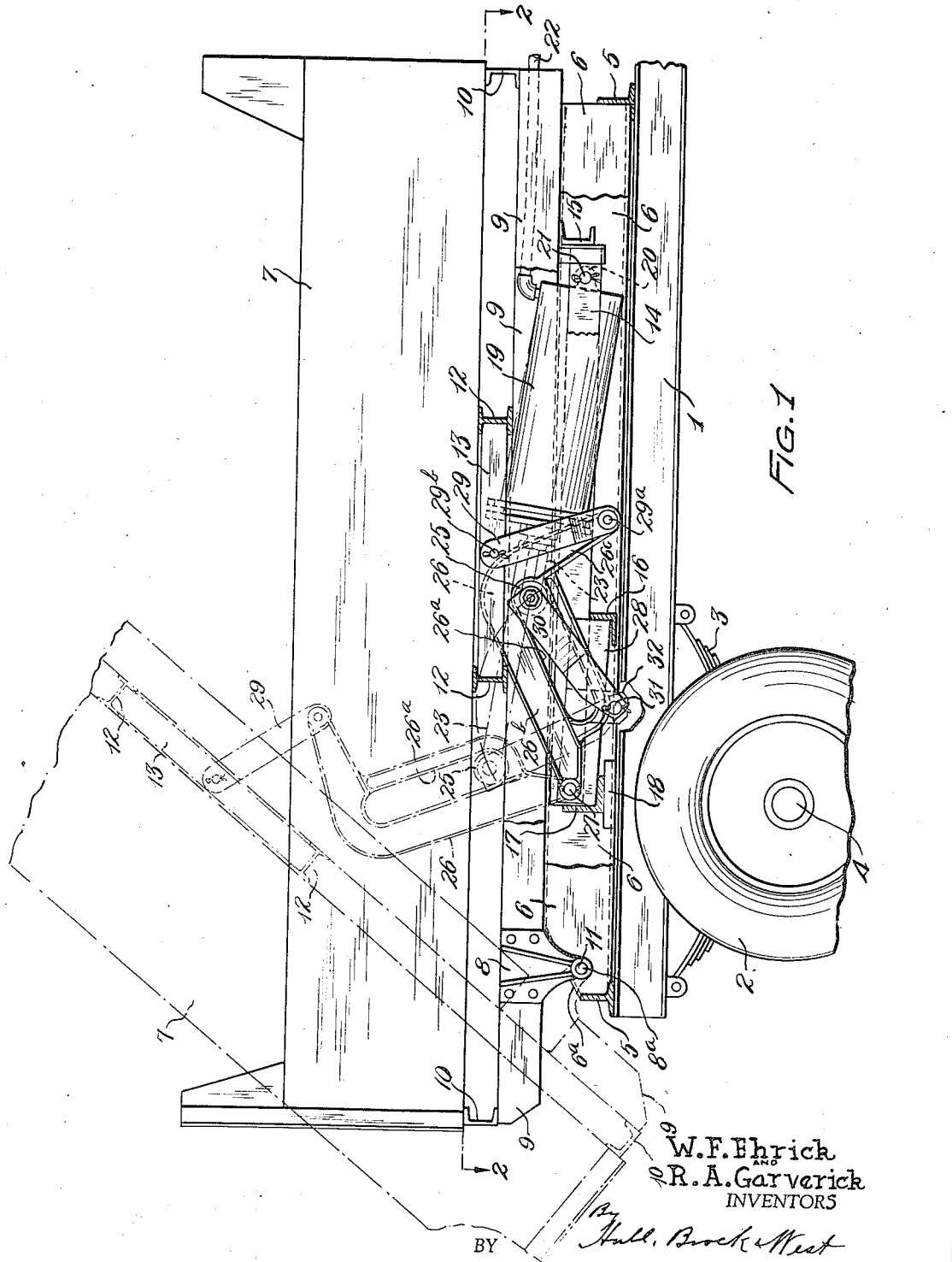

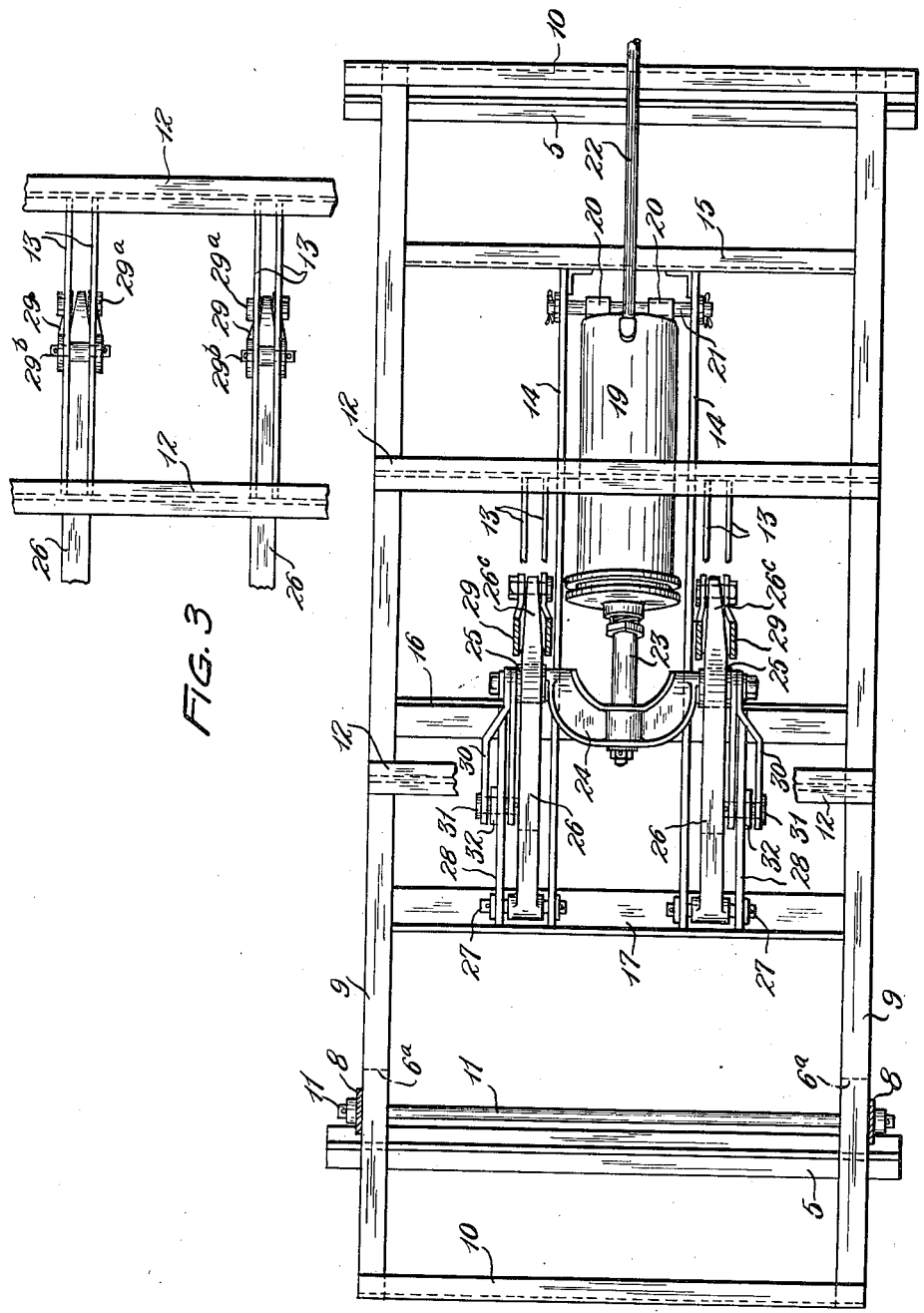

2,192,128

UNITED STATES PATENT OFFICE 2,192,128

DUMPING MECHANISM FOR TRUCK BODIES

William F. Ehrick and Ralph A. Garverick, Marion, Ohio, assignors to The Marion Metal Products Company, Marion, Ohio, a corporation of Ohio Application February 25, 1938, Serial No. 192,570

2 Claims. (Cl. 298—22)

This invention relates to mechanism whereby a dumping body may be raised and lowered and firmly supported when in both the dumping and the non-dumping positions.

The general object of the invention is to provide mechanism of this character which is simple, compact, inexpensive and efficient in operation.

The invention is illustrated in the drawings hereof, wherein Fig. 1 represents a side elevation of the rear portion of a dumping truck, parts being broken away to show the elements of said mechanism in their respective normal or non-dumping positions, the positions of these elements and of the dumping body at the end of a dumping operation being shown in dot-and-dash lines; Fig. 2 is a view corresponding substantially to the line 2—2 of Fig. 1, the tops of the pivot brackets for the dumping body and one of the cross members being broken away; and Fig. 3 is a fragmentary plan view of the frame work, carried by the bottom of the dumping body, with which the body lifting links of the dumping mechanism are connected.

Describing the parts by reference characters, 1 denotes the rear portion of one of the side members of a truck chassis, which members may be of any approved dimensions and construction; 2 one of the rear wheels thereof; and 3 one of the springs which are interposed between the axle 4 and the said side members. 5, 5 denote structural transverse cross members which extend between and are supported by the side members 1 and between which is located the sub-frame which carries and supports the cylinder and the other elements of the dumping mechanism.

The sub-frame comprises a pair of longitudinal side sills 6 having their opposite ends supported from the side members 1 by means of the cross members 5. The rear corners of the side sills 6 are beveled or cut away, as indicated at 6ª, thereby to accommodate the varying angular positions of the dumping body 7.

8 denotes brackets secured at their upper ends to longitudinal sills 9 located beneath the sides of the dumping body and supporting the front and rear of said body by means of cross members 10, the longitudinal sills being in turn supported upon the side members 6 of the sub-frame when the body is in its load-receiving and carrying position. These brackets preferably extend along the outer sides of the sills 6 and are provided with openings 8ª therethrough to accommodate a fulcrum rod 11 which extends across the entire width of and beneath the dumping body and through the sills 6.

Located beneath the floor of the body 7 is a framework to which the lifting links of the dumping mechanism are connected. This framework comprises a pair of transverse members 12, preferably located adjacent to the longitudinal central portion of the bottom of the body and supported by the sills 9. These transverse members in turn support pairs of spaced longitudinal bars 13, the said pairs of bars being spaced from and parallel with the sides of the body. 14 denotes a pair of longitudinal bars, each located adjacent to a pair of bars 13 and supported at their front ends by a transverse beam 15 which in turn is supported by the side sills 6 and at their rear portions by the top of a transverse angle beam 16 also supported by the side sills 6, the rear ends of the bars 14 extending to and preferably connected with the vertical flange of a transverse angle beam 17. The beam 17 is seated upon a base plate 18 which is supported by and between the side sills 6.

19 denotes a cylinder, the front head whereof is provided with sleeves 20 by means of which it is journaled upon a rod 21 supported by the bars 14. The cylinder is provided with a supply pipe 22 and with any standard means (not shown) whereby the operating fluid may be supplied to and exhausted from opposite ends thereof.

23 denotes the piston rod which is connected at its rear end to the middle of the cross head 24. The cross head is provided, adjacent to its outer ends, with rollers 25. These rollers are mounted within guides 26ª carried by lifting arms 26. These lifting arms are angular or L-shaped, comprising each an upwardly and forwardly extending branch 26ᵇ and a downwardly and forwardly extending branch 26ᶜ. The rear ends of these arms are pivotally mounted upon pins 27 supported by the rear ends of the bars 14 and by the rear ends of shorter bars 28 which are supported upon the horizontal flanges of the angle bars 16 and 17. The front branches 26ᶜ of the lifting arms 26 are each pivotally connected to and between the lower ends of duplex body lifting links 29, as shown at 29ª, the upper ends of said lifting links being pivotally connected to the bars 13, as indicated at 29ᵇ.

Each outer end of the cross head 24 is connected to a pair of stabilizing links 30, the lower ends of these links being supported on pins 31 located below and at the rear of the crosshead and each extending through a lug 32 depending from the bar 28 adjacent thereto.

With the parts constructed and arranged as described, the operation will be readily understood. When it is desired to tilt the body 7 to dumping position, fluid is supplied to the front end of the cylinder 19, moving the piston therein rearwardly, the motion of the piston being transmitted through the cross head 24 and rollers 25 to the lifting arms 26, thereby to move the said arms about their pivots 27. As these arms are lifted, the motion is transmitted through the body lifting links 29 to the framework beneath the dumping body, whereby the latter is rotated about its fulcrum rod 11. Meanwhile, the rollers 25 are moving down the guides 26ª, being stabilized in such movement by the links 30 which also limit the movement of the cross head and rollers to a definite arc. At the end of the dumping operation, these rollers will have reached the lower ends of the guides 26ª, thereby providing, in conjunction with the links 30, a positive stop to limit the dumping movement and to prevent the piston from being jammed against the rear cylinder head. By reversing the supply of pressure fluid, the body may be returned to its load-receiving position shown in full lines in Fig. 1, the guides 26ª, in conjunction with the links 30, serving to limit the movement of the piston toward the front cylinder head.

By the construction shown and described herein, it will be seen that we have provided a simple, compact and efficient mechanism for operating a dumping body and one which is comparatively inexpensive of production.

For convenience of reference, the relative positions of the elements of the dumping mechanism, as set forth in the claims thereof, are assumed to be the positions which they occupy when the dumping body is in its lowered or load-carrying and receiving position and with the dumping body arranged to dump from its rear end. However, we do not intend thereby to limit the use of our dumping mechanism to rear-dumping bodies.

Having thus described our invention, what we claim is:

1. The combination, with the chassis of a dumping vehicle, of a dumping body pivotally supported by said chassis, and mechanism also supported by the chassis for moving the said dumping body about its pivotal support, said mechanism including a cylinder pivotally supported by said chassis, a piston rod extending through the rear head of the said cylinder, L-shaped lifting arms comprising each a forwardly and upwardly extending rear branch and a downwardly and forwardly extending front branch, means pivotally supporting the rear ends of the said arms from the said chassis, the rear branches of the lifting arms being provided each with a longitudinal bearing surface having an abutment at the lower end thereof, a cross head carried by the piston rod and having end portions thereof engaging said surfaces, a pair of lifting links pivotally connected at their lower ends to the front ends of the said lifting arms, respectively, and having their upper ends pivotally connected to the said body, and a stabilizing link pivotally connected to each outer end portion of the cross head, the lower ends of the stabilizing links being pivotally supported by the said chassis at the rear of the cylinder and at points below and in front of the means for pivotally supporting the lifting arms and cooperating with the ends of the cross head to constitute a positive stop to limit the dumping movement of the body.

2. The combination, with the chassis of a dumping vehicle, of a dumping body pivotally supported by said chassis and mechanism also supported by the chassis for moving the said dumping body about its pivotal support, said mechanism including a cylinder pivotally supported by said chassis, a piston rod extending through the rear head of the said cylinder, L-shaped lifting arms comprising each a forwardly and upwardly extending rear branch and a downwardly and forwardly extending front branch, means pivotally supporting the rear end of each of the said arms from the said chassis, the forwardly extending rear branch of each of the lifting arms being provided with a longitudinal guideway, a cross head carried by the piston rod and having end portions thereof provided with rollers mounted in said guideways, means pivotally connecting the swinging ends of the said lifting arms to the said body, and a stabilizing link pivotally connected at one end to each outer end portion of the cross head and each having its other end pivotally supported by the said chassis at a point below and in front of the pivotal support for the lifting arm adjacent thereto, the said stabilizing links cooperating with the rollers and with the bottoms of the guideways to constitute a positive stop to limit the dumping movement of the body.

WILLIAM F. EHRICK.
RALPH A. GARVERICK.